United States Patent [19] | [11] 4,038,884
Chestnut et al. | [45] Aug. 2, 1977

[54] TIMING MECHANISM HAVING IN LINE INTERMITTENT DRIVE MEANS

[75] Inventors: Benjamin F. Chestnut, Greenwood; Ray A. Altenschulte, Indianapolis, both of Ind.

[73] Assignee: P. R. Mallory & Co., Inc., Indianapolis, Ind.

[21] Appl. No.: 654,048

[22] Filed: Jan. 30, 1976

[51] Int. Cl.[2] ..... F16H 53/00
[52] U.S. Cl. ..... 74/568 T
[58] Field of Search ..... 74/436, 437, 568 T

[56] References Cited

U.S. PATENT DOCUMENTS

| | | | |
|---|---|---|---|
| 466,923 | 1/1892 | Price | 74/437 |
| 3,090,249 | 5/1963 | Martin | 74/568 T |

FOREIGN PATENT DOCUMENTS

| | | | |
|---|---|---|---|
| 352,729 | 3/1961 | Switzerland | 74/436 |

*Primary Examiner*—Samuel Scott
*Assistant Examiner*—Wesley S. Ratliff, Jr.
*Attorney, Agent, or Firm*—Hoffmann, Meyer & Coles

[57] ABSTRACT

A timing mechanism has an intermittent drive mechanism disposed in axial alignment with a cam means and between an end plate of the timer housing and a plate carrying a constant speed drive means.

There is also included an adjusting means permitting manual setting of the cam means with respect to the switches responsive thereto.

4 Claims, 1 Drawing Figure

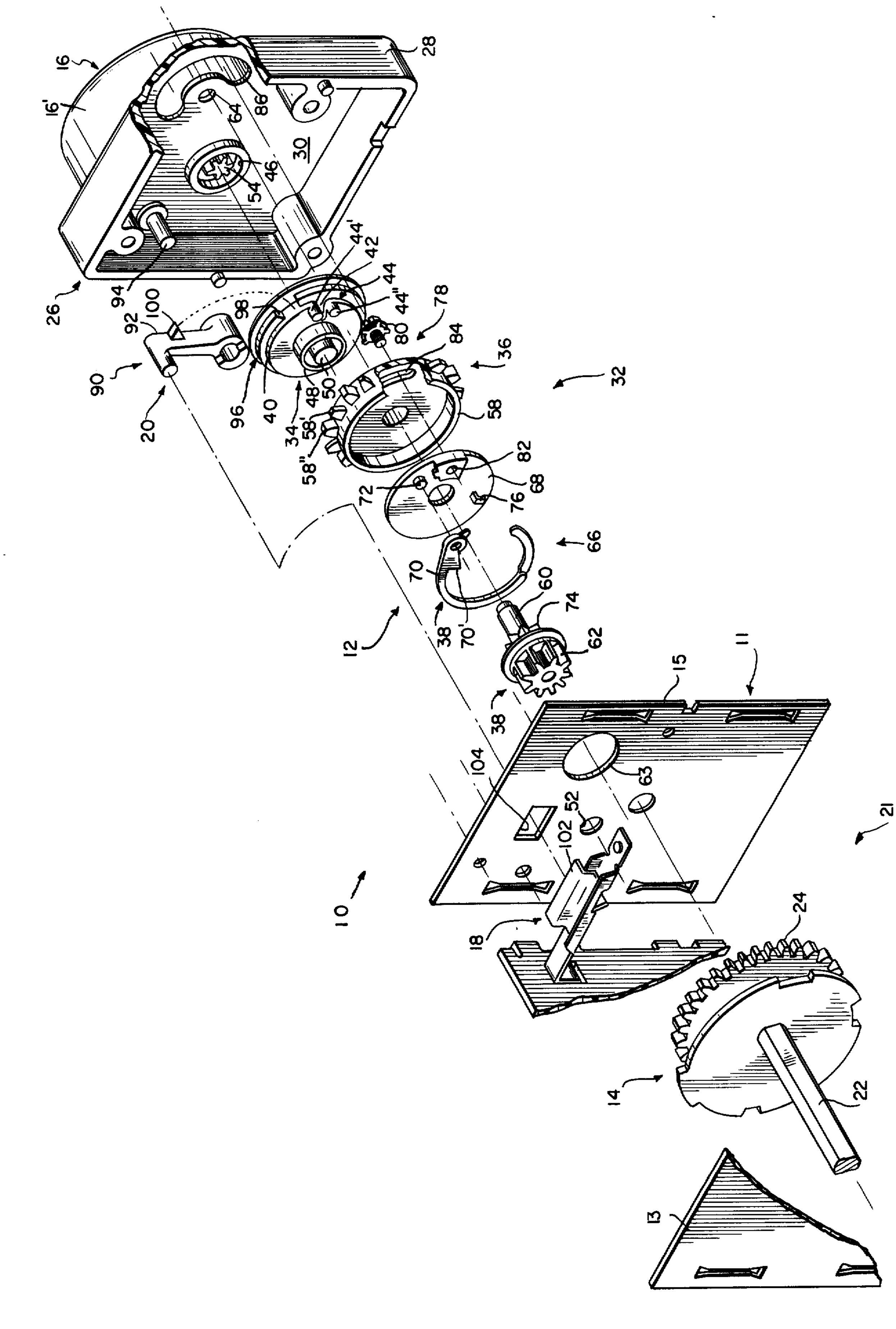
16
16'
28
64
86
30
46
54
94
26
44'
42
44
44"
98
100
92
90
20
96
40
48
50
34
58'
58"
80
78
84
36
32
58
82
68
76
72
66
70
60
74
38
70'
62
12
15
11
38
104
63
52
102
21
10
18
24
14
22
13

TIMING MECHANISM HAVING IN LINE INTERMITTENT DRIVE MEANS

Generally speaking the present invention relates to a timing mechanism which comprises a first housing including first and second oppositely disposed end plates defining a first space therebetween, a rotatable shaft carried within the first space by the end plates, cam programming means fixedly carried by the shaft, a gear connected to the shaft, and apertures in the first end plate providing access to the first space; a second housing including a third end plate disposed from an in alignment with the first and second end plates to provide a second space between the first and third end plates in line with the first space; a constant speed drive means carried by the third end plate and having an output means communicating with the second space through an aperture provided in the third end plate; and an intermittent drive means carried by the second space, the intermittent drive means coupled to the output means, whereby an intermittent rotation is imparted to the cam programming means in response to a constant output of the constant speed drive means.

Timing mechanisms of the type having a plurality of control cams and a plurality of control switches responsive to movement of the cams are widely used in appliance control applications. Generally, such timing mechanisms have an established program to which they are driven by an intermittent drive mechanism. The intermittent drive mechanism serves as a means for coupling the output shaft of a constant speed motor to the control cams of the timer. Its purpose is to provide a periodic rotational motion to the control cams.

As appliances become more complicated, the timing mechanisms required to control the appliances also tend to become more complicated. However, as would be expected, as the timing mechanisms become more complicated they become more costly and occupy more space.

Some appliances have become sufficiently complicated that, in addition to the normal sequencing provided by the cam means, some timing mechanisms provide for sub-interval timing means. Such means provide for a shorter time interval than normally provided for by the cam means of the timing mechanism. Where such intervals are required, the intermittent drive mechanism should also provide a means for providing a sub-interval means. This again adds to the space problem.

Typical of such intermittent drive means is that described and claimed in U.S. Pat. No. 3,747,420 "Drive Means For Interval Timer" issued July 24, 1973 to Richard H. Weber and Maurice E. Shuder which is incorporated herein by reference. As shown and described in such patent, the intermittent drive means is carried on a plate in a position next to or along side of a camstack providing a cam programming means for the timing mechanism. While this arrangement is satisfactory for some appliance applications, it is not satisfactory for others, such as, for example, washing machines or dishwashers where space is at a premium.

Another problem associated with such timing mechanisms is that of maintaining a "tight" working relationship between the cams and the switches responsive to the cams. More particularly, it has been found that the setting of the cams can be "off" such that a lobe of the cam does not operate a switch at the right time.

It is therefore, a feature of the present invention to provide a timing mechanism having an intermittent drive means wherein the component parts are arranged for a particular space utilization. Another feature of the invention is to provide such a timing mechanism which further includes a sub-interval timing means to provide a shorter time interval than normally provided by the timing mechanism. Another feature of the invention is to provide such a timing mechanism wherein the component parts of the timing mechanism are arranged substantially in a line. Still another feature of the invention is to provide such a timing mechanism wherein there is a space provided for a cam programming means and a space for an intermittent drive means, the spaces being substantially in line. Yet another feature of the invention is to provide such a timing mechanism wherein the intermittent drive means includes an adjusting means for manually setting the cam programming means such that a cam lobe engages a switch that is responsive to the cam at the proper time.

These and other features of the invention will become apparent from the following description taken in conjunction with the accompanying drawing which is an exploded view of the drive means of the timing mechanism.

Referring now to the drawing, there is shown a timing mechanism 10 which in general includes an intermittent drive means 12, cam means 14 which is responsive to movement of the intermittent drive means, a constant speed drive means 16, and electrical terminals (not shown) which are electrically connected to electrical switches 18, the switches being responsive to rotation of cam means 14. Also included as part of the intermittent drive means 12 is a sub-interval means 20. Drive means 16 is of a constant speed type and could, for example, includes a synchronous motor 16' and a speed reducing means such as a gear train.

Cam means 14 is enclosed in a housing 11 which includes at least two end plates 13 and 15 defining a space 21 therebetween. Cam means 14 is carried on a shaft 22 which is rotatably journalled in end plates 13 and 15. A gear 24 is connected to shaft 22.

A second housing 26 includes a cup shaped member 28 having an end plate 30 such that end plate 30 is disposed from and in line with end plates 13 and 15 to provide a space 32 in line with space 21. As shown intermittent drive means 12 is carried in space 32 to be in substantial axial alignment with cam means 14.

Intermittent drive means 12 includes cylindrical drive means 34, gear means 36, and means 38 coupling the gear means to the cam means 14. Cylindrical drive means 34 has, as shown, a generally cylindrical peripheral surface 40 having a recess 42 formed therein. The cylindrical drive means 34 also includes actuator means 44 which includes posts 44' and 44" disposed at each side of the recess 42. It should be understood that more than one recess and actuator means could be used. Cylindrical drive means 34 is journalled in aperture 46 in end plate 30 through hub 48 and in end plate 15 through hub 50 and aperture 52. The cylindrical drive means is rotatably driven by constant speed drive means 16 through motor pinion 54 which meshes with internal splines of hub 48 (not shown).

Gear means 36 includes a gear 58 which is carried on hub 60 of pinion 62. Pinion 62 is rotatably journalled in aperture 64 of end plate 30, and meshes with gear 24 through aperture 63. Gear 58 includes two sets of teeth 58' and 58", one set of which (58") has teeth the thickness of which is the full thickness of the gear, while gear teeth 58' has teeth of half-thickness.

The means 38 coupling gear means 36 to gear 24 in addition to pinion 62, includes a directional drive means 66. Directional drive means 66 includes a disc 68 which is fixedly carried inside gear 58 to be rotatable therewith, pawl 70 which is pivotly carried on disc 68 through post 72 and ratchet 74 which is unitarily constructed with pinion 62. Pawl 70 is resilient with its free end "sprung" about tab 76. Pinion 62 engages gear 24.

The timing mechanism also includes an adjusting means 78 which permits manual adjustment of cam means 14 and switches 18 which are responsive to the cam means. More particularly the adjusting means provides a means for adjusting the setting of cam means 14 such that any "slack" in the relationship between the position of the lobes of the cams and the points at which the lobes are to actuate the switches may be adjusted. Adjusting means 78 includes set screw 80 which fixedly holds disc 68 in place through threaded aperture 82 and arcuate slot 84 in which different positions of the set screw may be accomplished. Access to set screw 80 may be gained through arcuate slot 86 provided in end plate 30. Arcuate movement of set screw 80 causes rotion of disc 68 which, through the pawl 70 and ratchet 74, causes rotation of pinion 62 which in turn rotates cam means through gear 24. Thus the cam means may be manually set.

The operation of the intermittent drive means can now be described with reference to the elements thus far illustrated. Synchronous motor 16' turns pinion 54 at a constant speed in a predetermined direction. Pinion 54 will drive cylindrical drive means 34 through the internal splines (not shown) of hub 48 of the cylindrical drive means. Assuming cylindrical drive means 34 can be rotated in a counterclockwise direction, at the actuator means 44 approaches the teeth of gear 58, post 44" will engage one of the teeth 58' of less than full thickness, while one of the teeth 58" of greater thickness engages recess 42 as it is driven by post 44". When, as shown, recess 42 passes the interference path of the gear means 58 the full 58"engages the side 40 of the cylindrical drive means 34 thus preventing further rotation of the gear means 58. Thus, the intermittent drive means will only advance the cam means 14 when the actuator means 44 of the cylindrical drive means comes into engagement with the gear means 58. The intermittent rotation of the gear 58 causes intermittent rotation of pinion 62 through directional drive means 66 which in turn causes rotation of gear 24, thus causing intermittent rotation of cam mean 14.

The use of the directional drive means 66 in combination with the holding feature of the cylindrical drive means permits the cam means 14 to be manually set without "driving through" the motor 16. Specifically because of the holding feature of the cylindrical drive means the tooth 70' of pawl 70 will disengage from ratchet wheel 74 when the cam means 14 is rotated in the proper direction (clockwise).

The intermittent drive means also includes subinterval means 90. Sub-interval means 90 includes a lever 92 pivotally carried on post 94, and cam means 96. As shown, cam means 96 is unitarily constructed with cylindrical drive means 34 and includes a cam surface having a step 98. As the cam follower 100 of the lever rides over the cam surface and engages step 98 the lever pivots to actuate electrical switch 18 through plate 102, the end of the lever engaging the plate through aperture 104. The use of the sub-interval allows for shorter time sequences than are available from cam means 14.

What is claimed is:

1. A timing mechanism comprising:

a. a first housing including first and second oppositely disposed end plates defining a first space therebetween, a rotatable shaft carried within said first space by said end plates, cam means fixedly carried by said shaft, a gear connected to said shaft, and apertures in said first end plate providing access to said first space, b. a second housing including a third end plate disposed from and in alignment with said first and second end plates to provide a second space between said first and third end plates in line with said first space, c. a constant speed drive means carried by said third end plate and having an output means communicating with said second space through an aperture provided in said third end plate, and d. an intermittent drive means carried in said second space to impart intermittent rotation to said cam means in response to a constant speed output of said constant speed drive means, including 1. a cylindrical drive means coupled to and responsive to movement of said constant speed drive means, said cylindrical drive means including at least one peripheral recess, and actuator means disposed on each side of said recess,
   2. gear means responsive to movement of said cylindrical drive means, said gear means including two sets of teeth, one of said sets having a thickness greater than the other,
   3. rotation of said cylindrical drive means causing engagement of said actuator means with said sets of teeth so as to rotate said gear means as the set of teeth of greater thickness rotates through said recess, further rotation of said cylindrical drive means engaging said set of teeth of greater thickness with the side of said cylindrical drive means so as to hold said gear means from rotation, and
   4. a ratchet wheel carried by a second shaft and coupled to said gear, and substantially semi-circular pawl carried by a rotating disc mounted on said second shaft and coupled to said gear means, and a tooth extending from said semi-circular pawl and engaging said ratchet wheel, whereby intermittent rotation is imparted to said gear in a predetermined direction.

2. A timing mechanism according to claim 1 wherein said actuator means includes a post disposed at each side of said recess.

3. A timing mechanism according to claim 1 wherein a second cam means is coupled to said constant speed motor drive means and at least one pivotally mounted lever means is responsive to said second cam means.

4. In a timing mechanism wherein a switch means is responsive to rotation of a cam means, and wherein a coupling means couples said cam means to constant speed drive means to be rotated thereby, an improvement characterized by:

said coupling means including an adjusting means permitting manual setting of said means with respect to said switch means comprising a rotatable disc coupled to said cam means, a second member disposed adjacent said disc, and a set screw engaging said disc through an arcuate slot in said second member permitting arcuate movement of said set screw.

* * * * *